C. H. WORDINGHAM.
DISCONNECTING DEVICE FOR ELECTRIC SUPPLY CIRCUITS.
APPLICATION FILED AUG. 12, 1918.

1,304,236.

Patented May 20, 1919.
3 SHEETS—SHEET 1.

INVENTOR
C. H. Wordingham
BY L. R. Kerslake
ATTORNEY

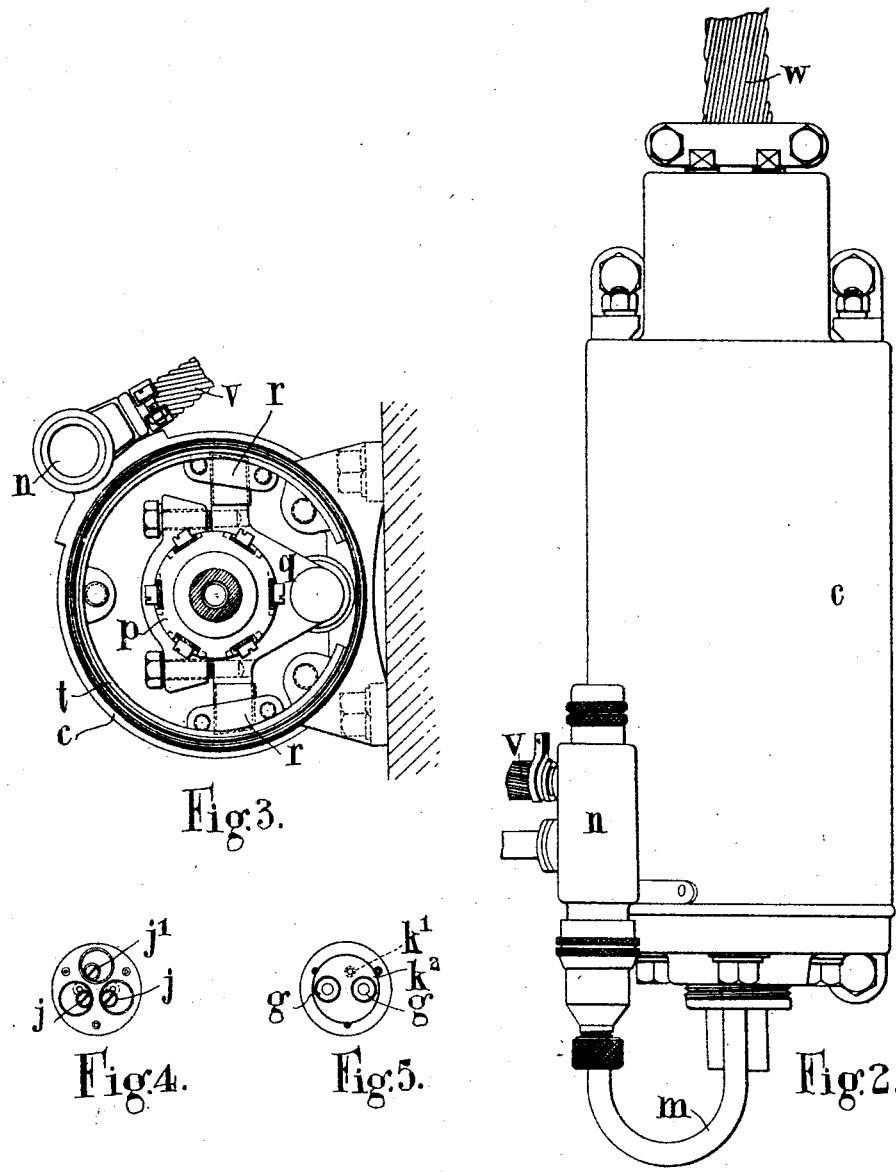

C. H. WORDINGHAM.
DISCONNECTING DEVICE FOR ELECTRIC SUPPLY CIRCUITS.
APPLICATION FILED AUG. 12, 1918.
1,304,236.
Patented May 20, 1919.
3 SHEETS—SHEET 3.
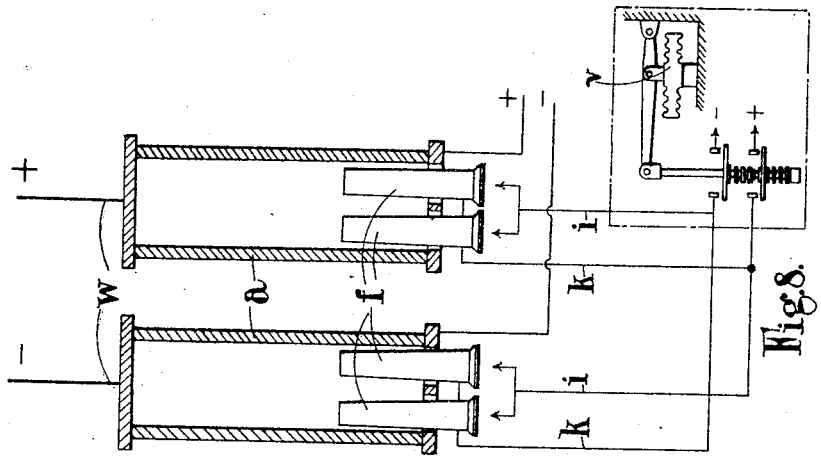
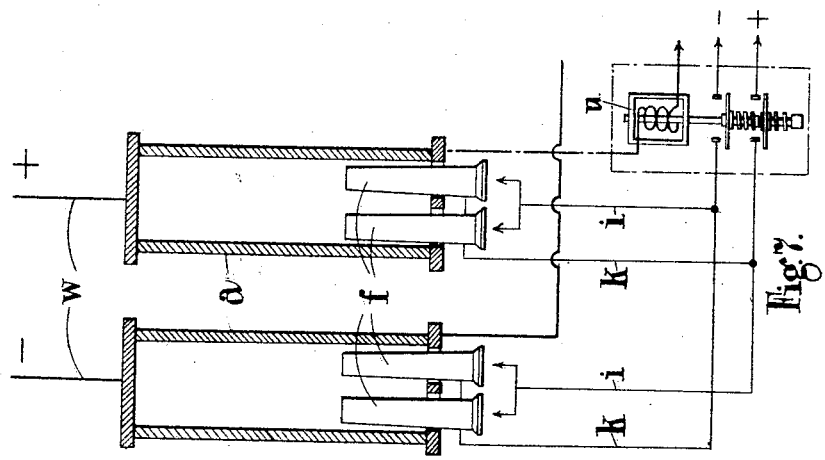
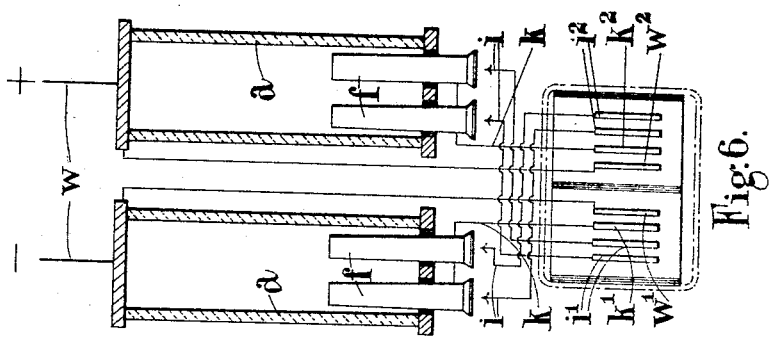
INVENTOR
C. H. Wordingham.
BY H. R. Kerslake
ATTORNEY

UNITED STATES PATENT OFFICE.

CHARLES HENRY WORDINGHAM, OF REDHILL, ENGLAND.

DISCONNECTING DEVICE FOR ELECTRIC SUPPLY-CIRCUITS.

1,304,236.   Specification of Letters Patent.   Patented May 20, 1919.

Application filed August 12, 1918. Serial No. 249,574.

*To all whom it may concern:*

Be it known that I, CHARLES HENRY WORDINGHAM, a subject of the King of Great Britain and Ireland, and resident of Beechgrove, Ridgeway Road, Redhill, in the county of Surrey, England, have invented certain new and useful Improvements Relating to Disconnecting Devices for Electric Supply-Circuits, of which the following is a specification.

This invention has for its object to provide an improved cut-out or disconnecting means for isolating sections of electric distribution systems, either automatically, as in the case of flooding, fire, or excessive overload, or under manual control.

My invention comprises the provision in the mains of each circuit to be isolated, of rupturable conductors, and the combination therewith of means brought into action by auxiliary circuits (closed for example by hand, by a flood switch, a thermostat, or by an overload relay) for destroying or breaking the said conductors.

My invention further comprises the arrangement of the rupturable conductors in the form of tubes or cylinders, with which are provided detonators or the like for the rapid generation of a sufficient gas pressure within the tubes or cylinders to effect their destruction on the closing of the auxiliary circuits.

My invention further comprises the details of construction hereinafter described.

Referring to the accompanying explanatory drawings:—

Figure 1 is a sectional elevation and

Fig. 2 an elevation of a cut-out or disconnecting device construction in one convenient form in accordance with my invention.

Fig. 3 is a sectional plan view on the line A—B of Fig. 1.

Figs. 4 and 5 are detail views to be hereinafter referred to.

Figs. 6, 7 and 8 show diagrammatically arrangements for closing the auxiliary circuits by a flood switch, an overload relay and by a thermostat respectively.

The same reference letters in the different views indicate the same or similar parts.

Figure 1:
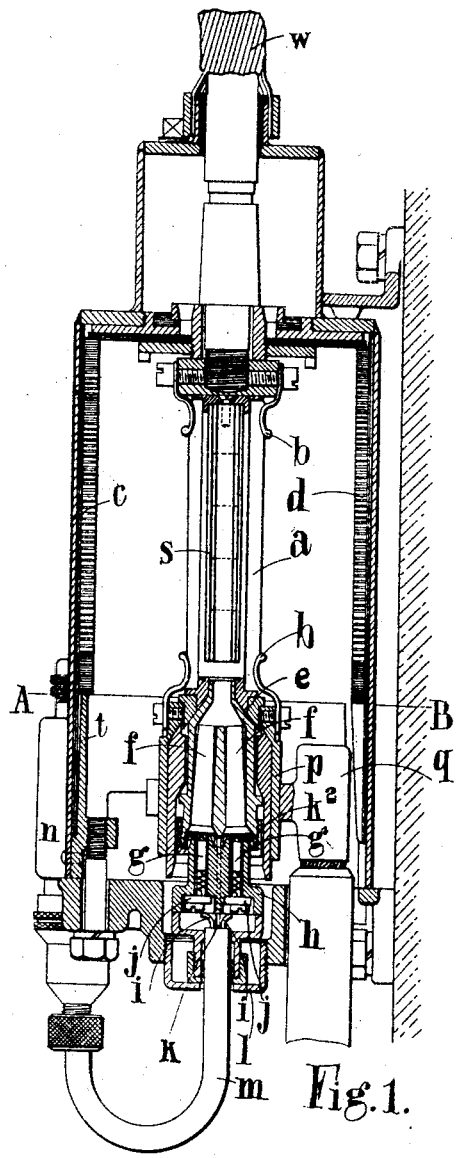

In the illustrated example, the cut-out or disconnecting device comprises a carbon tube or cylinder $a$ inserted in the main and held and connected by flexible or spring clips $b$ at each end, the device being inclosed within a suitable casing $c$ which may be lined with alternate insulating and metal rings $d$ as shown for damping the arc formed on rupture of the cylinder $a$. One of the cut-outs is provided for each pole of each circuit which it may be desired to isolate, the complete electrical arrangements being shown diagrammatically and as examples in Figs. 6, 7 and 8. At the lower end of the tube or cylinder is a metal carrier $e$ containing two detonators $f$ with which electrical contact is made by spring pressed plungers $g$. The latter are carried in a holder $h$ of insulating material. The wires $i$ of the auxiliary circuit contact with the terminals $j$ in the member $h$, and so are in electrical connection with the spring pressed plungers $g$, while the return wire $k$ is in electrical contact with the detonator carrier $e$ by way of the stud $k'$ and terminal $j'$. Fig. 4 is an inverted plan view showing the three terminals $j, j, j'$ while Fig. 5 is a plan view showing the plungers $g$ and the end of the return stud $k'$, which is attached to a metal plate $k^2$ carried by $h$ and in electrical connection with the detonator carrier $e$.

With the arrangement illustrated, if the cap $l$ be loosened, and likewise the connection of the cable $m$ to the plug box $n$, then the detonator carrier $e$, and the member $h$ can be withdrawn in one piece. The length of the cable $m$ is such that the auxiliary circuit must be broken by disconnecting the cable from the plug box $n$ before the detonators can be withdrawn from positions for examination or renewal purposes.

The detonator carrier $e$ is supported within the insulated lining of a cylinder-like member $p$ clamped within the clip $q$ forming part of the cable socket as shown. One part of said clip is supported in but insulated from the skirt liner $t$ in the lower part of the casing $c$ by grips $r$ (see Fig. 3).

I preferably provide filling means, such as the blocks $s$ supported within the tube or cylinder $a$, for reducing the volume to be occupied by the gas on the firing of the detonators $f$.

It will be understood that I may employ only one detonator for generating the necessary gas pressure within each tube or cylinder $a$, but I prefer to employ two detonators as an additional safeguard in securing certainty of action.

The casing $c$ in the illustrated example acts in the manner of a diving bell to protect the live terminal within it from contact with water should the disconnecting device be immersed when the rupturable conductor has been destroyed.

The auxiliary circuit containing the detonators $f$ may be closed by hand, by a flood switch (which may be in the form of a rising and falling float carrying or operating electrical contacts, or of terminals which become immersed in the flooding water), by an overload relay, by a thermostat or in any other convenient manner.

In the arrangement illustrated diagrammatically at Fig. 6, the auxiliary circuit for firing the detonators is closed by the flooding water in case the compartment or area served by the branch supplied through the cut-out or disconnecting device becomes flooded, the said flooding water completing the circuit between terminals $i'$, $k'$, $w'$ in one compartment of the flood switch and $k^2$, $i^2$ and $w^2$ in the other compartment. I do not limit myself to any particular construction of the flood switch.

In the diagram, Fig. 7, the auxiliary circuit containing the detonators $f$ is shown as being closed by an overload relay, represented diagrammatically at $u$: while in Fig. 8, a thermostat $v$ performs a similar function. The auxiliary circuit may be closed by a hand controlled switch, if desired.

It will be understood that when the auxiliary circuit containing the detonators $f$ is closed, the detonators are fired and cause the complete shattering and destruction of the tubes or cylinders so that the circuit fed therethrough is effectually isolated.

In the arrangement illustrated in Figs. 1 and 2, the current for the auxiliary circuit is obtained from the main above or on the supply side of the frangible cylinder $a$ and is taken by an armored cable V to the plug box $n$. The multi-core cable W contains the supply cable connection and also the connections between the terminals $j$, $j$, $j'$ and the operating device, (see Fig. 7). The current for the auxiliary circuit may be obtained from above or below the rupturable cylinder or from an independent source.

I do not limit myself to the details of the cut-out or disconnecting device, but may modify the same to suit requirements.

Having now described my invention what I claim as new and desire to secure by Letters Patent is:—

1. An electric disconnecting device consisting of a rupturable tubular conductor arranged in the supply main, with means for generating a sufficient gas pressure within said conductor to shatter and destroy the same, as set forth.

2. An electric disconnecting device consisting of a rupturable tubular conductor arranged in the supply main, means for generating a sufficient gas pressure within said conductor to shatter and destroy the same, an auxiliary electrical circuit containing said gas generating means, and means for closing said auxiliary circuit, as set forth.

3. An electric disconnecting device consisting of a rupturable tubular conductor arranged in the supply main, detonating means for generating a sufficient gas pressure within said conductor to shatter and destroy the same, an auxiliary circuit containing said detonating means, and a flood switch for closing said auxiliary circuit, as set forth.

4. An electric disconnecting device consisting of a rupturable conductor arranged in the supply main, means for generating a sufficient gas pressure within said conductor to shatter and destroy the same and a diving bell inclosing the disconnecting means, as set forth.

5. An electric disconnecting device consisting of a rupturable conductor arranged in the supply main, a diving bell inclosing the disconnecting means, means for generating a sufficient gas pressure within said conductor to shatter and destroy the same, the said gas generating means forming a complete detachable unit, a flood switch for bringing the gas generating means into action, the said switch comprising electrical terminals between which electrical continuity is established by flooding water, as set forth.

In testimony whereof I have signed my name to this specification.

CHARLES HENRY WORDINGHAM.

Copies of this patent may be obtained for five cents each, by addressing the "Commissioner of Patents, Washington, D. C."